United States Patent [19]
Ojaniemi

[11] Patent Number: 6,055,427
[45] Date of Patent: Apr. 25, 2000

[54] HARD HANDOFF AND A RADIO SYSTEM

[75] Inventor: Heikki Ojaniemi, San Diego, Calif.

[73] Assignee: Nokia Telecommunications Oy, Espoo, Finland

[21] Appl. No.: 08/683,406

[22] Filed: Jul. 18, 1996

[51] Int. Cl.[7] .................................................. H04Q 7/20
[52] U.S. Cl. ........................ 455/436; 455/438; 455/442; 370/331
[58] Field of Search .................................. 455/436, 437, 455/438, 442, 443; 370/331, 332, 335

[56] References Cited

U.S. PATENT DOCUMENTS

| | | | |
|---|---|---|---|
| 5,267,262 | 11/1993 | Wheatley, III | 375/1 |
| 5,303,289 | 4/1994 | Quinn | 455/436 |
| 5,313,489 | 5/1994 | Menich et al. | 375/1 |
| 5,594,718 | 1/1997 | Weaver, Jr. et al. | 375/331 |
| 5,640,414 | 6/1997 | Blakeney II, et al. | 375/200 |

FOREIGN PATENT DOCUMENTS

| | | |
|---|---|---|
| 2 282 730 | 4/1995 | United Kingdom . |
| WO 96/28947 | 9/1996 | WIPO . |

OTHER PUBLICATIONS

Patent Abstracts of Japan, Publication No. 08140139, Application No. 06277645, Date of Publication May 31, 1996, Reconnetion type channel switching.

*Primary Examiner*—Daniel S. Hunter
*Assistant Examiner*—Darnell R. Armstrong
*Attorney, Agent, or Firm*—Pillsbury Madison & Sutro LLP

[57] ABSTRACT

A network system of a radio system includes procedures and apparatus for updating, by means of which the usage parameters of a subscriber station are updated prior to a hard handoff, so as to be suitable for a connection intended to be in effect subsequent to the hard handoff. The network system also includes procedures and apparatus for assisting a hard handoff for selecting, on the basis of the results of measurements of a pilot signal, a best base station as a handoff candidate to which the hard handoff is performed when necessary. The network system also has procedures and apparatus recovery for reserving and recovering the initial connection of the subscriber station to the base station in case a hard handoff fails. Connection losses in hard handoff and interferences caused by the wrong transmitting power are thus reduced.

14 Claims, 9 Drawing Sheets

AN ACTIVE CONNECTION ON A TRAFFIC CHANNEL
TRHROUGH BTS_2

HARD HANDOFF AND A RADIO SYSTEM

FIELD OF THE INVENTION

The present invention generally relates to telecommunication systems. More specifically, the invention relates to a digital cellular radio system utilizing the CDMA technique and hard handoff, in particular.

BACKGROUND OF THE INVENTION

A cellular radio system typically comprises a fixed base station network, and a plurality of subscriber stations, each communicating with one or more of its base stations. A base station forwards traffic received from a subscriber station. By means of the base stations, the subscriber stations may send messages both to one another and to the subscriber stations of other telephone systems when they are within the coverage area of the base station network, whether they are moving or stationary. In order that a subscriber station can use the services offered by the cellular radio system, the subscriber station must maintain a connection to at least one base station in all circumstances. When a subscriber station does not use the services of the base station network, no connection is required, but each subscriber station listens to one or more of the base stations when the respective subscriber station is in an idle mode. When the subscriber station travels within the base station network from the coverage area of one base station to that of another base station, a need arises for performing a handoff.

In a typical cellular radio system, the subscriber station only communicates with one base station at a time, although in the CDMA system in particular, the subscriber station may simultaneously communicate with a plurality of base stations. In a soft handoff in accordance with prior art, the connection to the base station network remains uninterrupted despite the handoff. In this kind of handoff, the base station is typically changed. Another handoff technique in accordance with prior art is softer handoff, in which the base station is not changed, but the sector of the base station used is changed. Soft and softer handoffs are termed as make-before-break handoffs, which indicates that a new connection is established for the subscriber station before terminating the old connection. In both handoff techniques, the frequency band used remains the same.

In cellular radio systems, so-called hard handoff is also used, which is a break-before-make handoff. This means that a new connection from a subscriber station to a new base station is established only after releasing the connection to an old base station. Although the CDMA system, in particular, has been designed to operate supported by soft and softer handoffs, there are several reasons in cellular radio systems for performing a hard handoff. These reasons may be, e.g., a need to change the usage parameters, the frequency band used, the radio system, etc.

When performing a hard handoff in prior art solutions, it is not possible to determine (i.e. transfer to the subscriber station) all the usage parameters related to the new connection before the handoff. In the existing solutions, it is not possible either, to return to use the previous connection in case the hard handoff fails. Furthermore, a subscriber station cannot be used for performing a hard handoff with the assistance of another subscriber station. A hard handoff cannot be assisted by any other part of the of the cellular radio system, either. These lacking features are obvious drawbacks related to the prior art radio systems.

SUMMARY OF THE INVENTION

The object of the present invention is thus to implement a hard handoff, reducing the possibility of losing the entire connection in hard handoff. Another object is to improve the possibilities to adjust the transmitting power, thus reducing interference in the cellular radio system.

This and the other objects of the invention will be illustrated when studying the preferred embodiments of the invention by means of the attached figures and explanation.

BRIEF DESCRIPTION OF THE DRAWINGS

In the following, the invention will be disclosed with reference to the examples in the attached drawings, in which.

DETAILED DESCRIPTION OF A PREFERRED EMBODIMENT OF THE INVENTION

Figure 1:
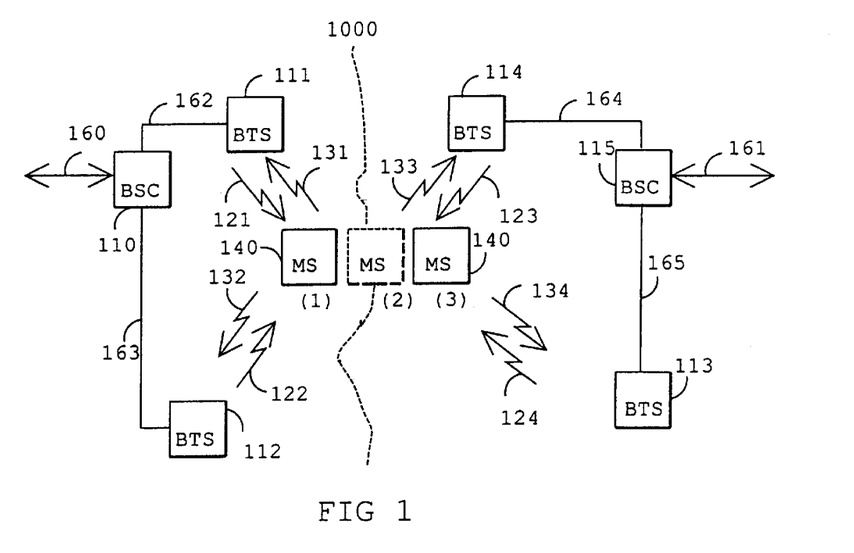
FIG. 1 shows a cellular radio system.

The solution in accordance with the invention is suited for spread spectrum systems, especially CDMA systems, on the basis of which the invention will be disclosed in the following. The invention is not limited thereto, however. Signals closely related to the invention are emphasized in the figures and the text by typing them all with capital letters. FIG. 1 shows a cellular radio system in accordance with the CDMA system, comprising base stations 111–114, base station controllers 110 and 115, typically digital transmission links 162–165 and a subscriber station 140. In addition, FIG. 1 shows bidirectional connections 121, 131, 122, 132, 123, 133 and 124, 134 between subscriber station 140, and connections 160 and 161 from base station controllers 110 and 115 to a mobile services switching center MSC. A base station controller and a mobile services switching center may also be connected together into a mobile telephone switching office MTSO. A dotted line 1000 illustrates the boundary area between different base station controllers 110 and 115. In location 1, subscriber station 140 is communicating 121, 131 and 122, 132 with base stations 111 and 112. When subscriber station 140 travels within the base station network, it reaches location 2, where it is in the boundary area of two base station controllers 110 and 115, and also on the edge of the coverage area of base stations 111 and 112. Thus, a handoff, i.e. a change of base stations 111 and 112 to base stations 113 and 114 is performed for the subscriber station 140.

Figure 2:
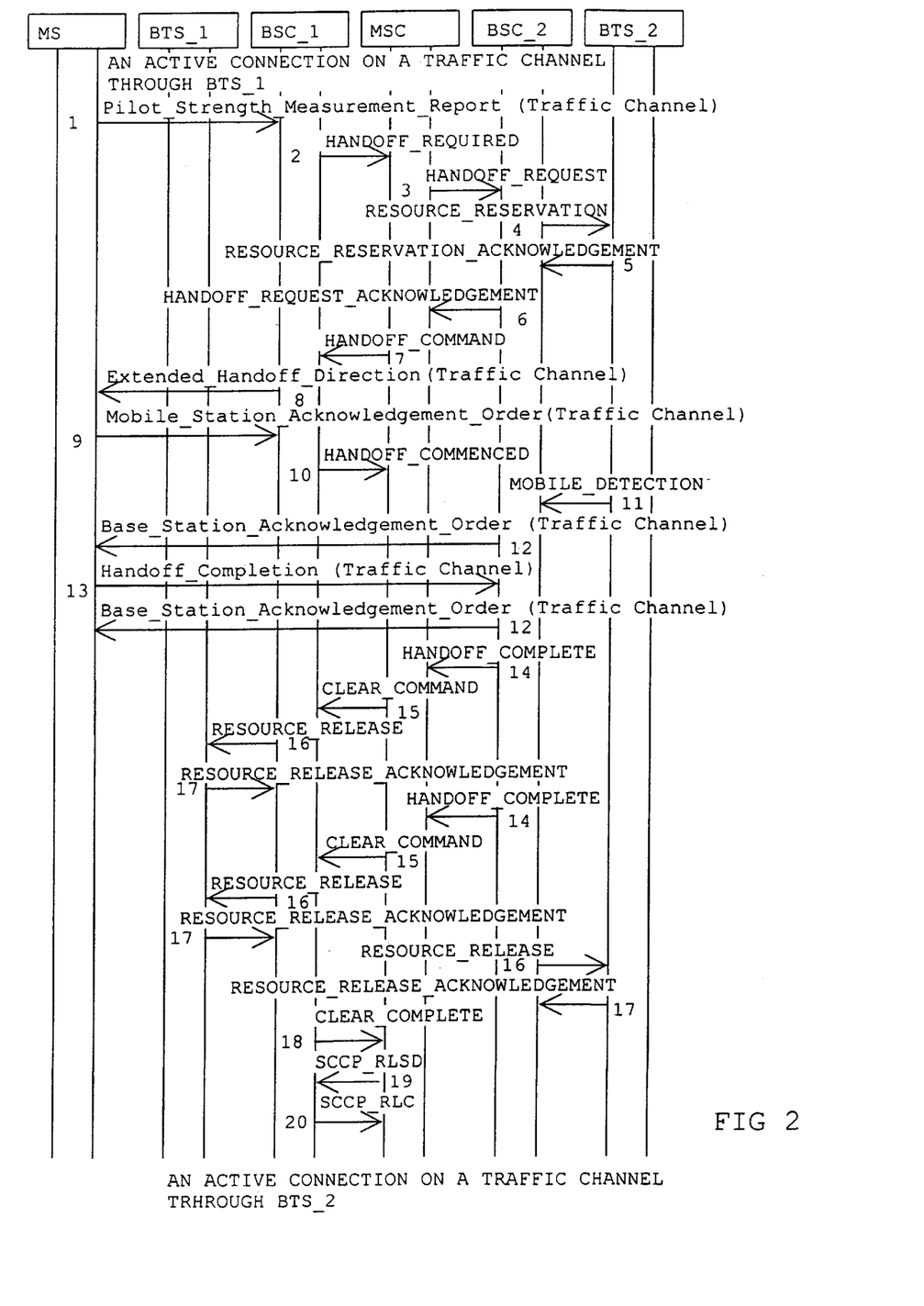
FIG. 2 shows a flow chart of hard handoff.

FIG. 2 shows a solution of the invention in form of a flow chart based on a CDMA system. In the flow charts of FIGS. 2–7, the signals in accordance with the invention are all typed with capital letters. From the point of view of the invention it is advantageous that a subscriber station MS, which is assumed to be the same as the subscriber station 140 shown in FIG. 1, measure the pilot signals of the base stations that are on the same frequency band and/or on another frequency band as that subscriber station. At the beginning, the subscriber station communicates with a base station BTS_1, which is assumed to be the same as base station 111 in FIG. 1. The subscriber station MS transmits at regular intervals, or when the audibility of the pilot signals changes sufficiently, a signal 1 Pilot_Strength_Measurement_Report to a base station controller BSC_1, which is assumed to be the same as the base station controller 110 in FIG. 1. Signal 1 Pilot_Strength_Measurement_Report is advantageously transmitted on a traffic channel, and it contains information on the pilot signals of the base stations, measured by the respective subscriber station MS.

If the pilot signal transmitted from a base station BTS_2, which is the same as base station 114 in FIG. 1, and not the same as BTS_1 communicating with the subscriber station MS, is the strongest at the subscriber station MS, BSC_1 will conclude from that fact that a handoff is necessary, and request a handoff to BTS_2 from a mobile switching center MSC by means of a signal 2 HANDOFF_REQUIRED. After receiving this signal, the MSC will request handoff from a base station controller BSC_2 with a signal 3 HANDOFF_REQUEST. BSC_2, in turn, then reserves a traffic channel from BTS_2 with a signal 4 RESOURCE_RESERVATION. BTS_2 acknowledges the channel reservation and transmits an acknowledgement signal 5 RESOURCE_RESERVATION_ACKNOWLEDGEMENT. After receiving an acknowledgement of the channel reservation, BSC_2 transmits a signal 6 HANDOFF_REQUEST_ACKNOWLEDGEMENT to the MSC indicating acknowledgement of the handoff request. After receiving this signal, the MSC transmits a handoff command 7 HANDOFF_COMMAND to BSC_1. After receiving this signal, BSC_1 transmits to the subscriber station MS typically on the traffic channel a signal 8 Extended_Handoff_-Direction, which is acknowledged by the subscriber station MS by transmitting a signal 9 Mobile_Station_-Acknowledgement_Order, also typically on the traffic channel. Usage parameters associated with the new connection may also be transferred to the subscriber station in connection with the hard handoff. In accordance with the specification, the Extended_Handoff_Direction signal contains various information about the message, such as fields NOM_PWR_EXT and NOM_PWR. Mobile_Station_Acknowledgement_order, in turn, contains fields in accordance with the specification, those fields containing information about the message, and the acknowledgement. After the acknowledgement, BSC_1 communicates to the MSC that the handoff may be initiated with a signal 10 HANDOFF_COMMENCED.

Handshaking between a base station or base stations and a subscriber station is performed in a traffic channel in the way it is described here. For terminating the initial connection it is important to notice whether the handoff was successful. When the subscriber station MS starts transmission to BTS_2 after BSC_1 has indicated the handoff with signal 10 to the MSC, BTS_2 will detect the subscriber station MS and report it to BSC_2 with a signal 11 MOBILE_DETECTION, which will ensure that there is no need in the handoff to return to the initial connection between the subscriber station MS and BTS_1. After detecting the transmission of the subscriber station MS, BSC_2 will acknowledge communication with subscriber station MS with a signal 12 Base_Station_Acknowledgement_Order, which is typically transmitted along the traffic channel. The subscriber station MS answers this signal by acknowledging with a signal 13 Handoff_Completion that the handoff had been completed, which signal is also typically transmitted on the traffic channel. The base station controller advantageously answers the handoff acknowledgement 13 by re-transmitting to the subscriber station MS signal 12 Base_Station_Acknowledgement_Order and by transmitting to the MSC a report of successful completion of the handoff with a signal 15 HANDOFF_COMPLETE. After receiving this signal, the MSC starts to release the reserved resources related to the initial connection between the subscriber station MS and BTS_1. The MSC transmits to BSC_1 a signal 15 CLEAR_COMMAND for releasing the connections. After receiving signal 15, BSC_1 sends BTS_1 a resource release command 16 RESOURCE_RELEASE. This release command 16 is acknowledged by BTS_1 by transmitting a signal 17 RESOURCE_RELEASE_ACKNOWLEDGEMENT. BTS_1 thus uses the released channel resources for other connections. Once the reserved resources have been released for other purposes, BSC_1 transmits a CLEAR_COMPLETE signal 18 reporting the releases to MSC. Thereafter, the connection between MSC and BSC_1 is terminated and released for other purposes, whereby BSC_1 transmits a release signal 19 SCCP_RLSD, which is acknowledged by the MSC, and the MSC terminates the connection by transmitting a signal 20 SCCP_RLC. All the resources related to the initial connection between the MS and BTS_1 are now released, and a new connection between the MS and BTS_2 is established.

In this example, the hard handoff is actuated by the signal Pilot_Strength_Measurement_Report transmitted by the subscriber station to the base station controller. The subscriber station MS typically continuously measures the levels of the signals it receives from the base stations, the pilot signal being particularly suitable for this purpose. The Cellular radio system has determined that these base stations whose signals are measured will be the base stations which are adjacent the base station used by the subscriber station MS. In a preferred embodiment of the invention, the subscriber station MS listens to the signals of the base stations on the same and/or another frequency band. When the subscriber station MS measures the pilot signals, it can be concluded on the basis of the measurement data when the connection of the subscriber station MS would be better to be to some other base station than to the one which is currently used. This data can then be utilized upon selecting a base station candidate or candidates for a new connection. On the basis of the signal Pilot_Strength_Measurement_Report 1 transmitted by the subscriber station, BSC_1 thus selects a base station candidate or candidates for a new connection, and the subscriber station MS thus performs a hard handoff to at least one of said candidates when a handoff is required. A hard handoff can thus be performed advantageously with the assistance of a subscriber station.

It is not always possible, however, to transmit a Pilot_Strength_Measurement_Report signal 1, and it is therefore necessary to initiate or activate a hard handoff in some other way. In any case, the actual hard handoff substantially proceeds in accordance with the attached flow chart.

In a preferred embodiment of the invention, usage parameters associated with the new connection may also be transferred to the subscriber station. MS prior to the handoff. Typical examples of these parameters are those for adjusting the transmitting power of the subscriber station MS. In the prior art, particularly in the CDMA system, these parameters include e.g., Extended Nominal Transmit Power (NOM_PWR_EXT) and Nominal Transmit Power (NOM_PWR), which are transmitted to the subscriber station and used by the subscriber station MS for calculating the value for its own transmitting power. In a prior art solution, the subscriber station MS obtains the power adjustment parameters from the radio system after the handoff. In other words, the subscriber station MS first uses the wrong power adjustment parameters NOM_PWR_EXT and NOM_PWR, and thus the wrong transmitting power after the handoff. In a soft handoff, the wrong values for power adjustment parameters NOM_PWR_EXT and NOM_PWR do not cause problems, since continuous power control eliminates the error rapidly, but in a hard handoff, the power control is reset, and it thus does not function at the first moments after the handoff, which causes quite a different situation.

In the solution of the invention, the subscriber station MS advantageously receives new power control parameters NOM_PWR_EXT and NOM_PWR from base station controller BSC_1 transmitted by base station BTS_1 in signal 8 Extended_Handoff_Direction_Message before the connection is handed over from BTS_1 to BTS_2. BSC_2 defines the correct values for NOM_PWR_EXT and NOM_PWR, and sends them to MSC in HANDOFF_REQUEST_-ACKNOWLEDGEMENT 6. MSC sends these power control parameters to BSC_1 in HANDOFF_COMMAND 7. These values for power control parameters are valid when the subscriber station MS is communicating with base station BTS_2. It is extremely important from the point of view of handoff that the MS use the correct transmitting power immediately when the connection is established, since, if the transmitting power of the subscriber station MS is too low, the connection with the base station will not be established, and the handoff will fail, or if the transmitting power of the subscriber station MS is too high, the transmitting power will cause interference to other connections, thus possibly interrupting some connection.

Figure 3:
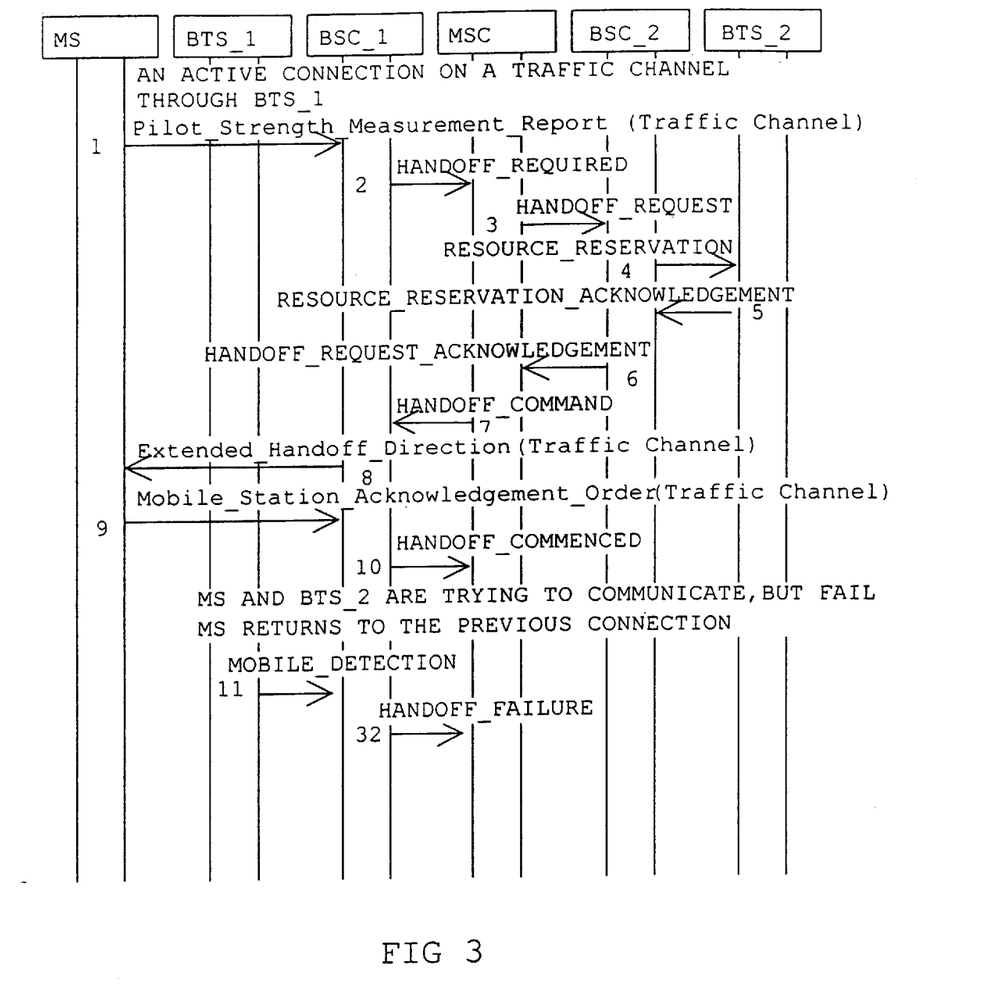
FIG. 3 shows a flow chart in case of a failed hard handoff.

In the solution of the invention, if establishing a connection to a new base station BTS_2 fails during a hard handoff, the method will return to the initial connection between the subscriber station MS and BTS_1. FIG. 3 illustrates this feature of the invention. The first part of the handoff procedure is similar to that illustrated in FIG. 2, but at some stage after signal 10 HANDOFF_COMMENCED received from BSC_1 to the MSC, the subscriber station does not, however, succeed in establishing a connection to BTS_2 despite the attempt, in which case the handoff fails. The operator of the radio system may determine how long the subscriber station MS and BTS_2 may try to establish a connection. From the user's point of view, this time is extremely short, and the user advantageously does not notice this time required for an attempt to establish a connection. When no connection is achieved between the subscriber station MS and BTS_2, the original base station BTS_1 continues communicating with the subscriber station. This takes place e.g., so that BTS_1 transmits a signal 11 MOBILE_DETECTED to BSC_1. Thereafter, BSC_1 transmits an indication 32 HANDOFF_FAILURE of a failed handoff to MSC, whereby the resources are changed so, that the channel used by the subscriber station MS remains in the use of the subscriber station MS also after the time required for reservation made in the handoff. In the solution of the invention, the base station controller BSC_1 used for the initial connection maintains the connection intended for the subscriber station reserved for the duration of the hard handoff procedure, which time is extremely short from the user's point of view. The reservation time may be determined by the operator. If the handoff fails, the subscriber station MS returns to use the initial connection with BTS_1.

Figure 4:
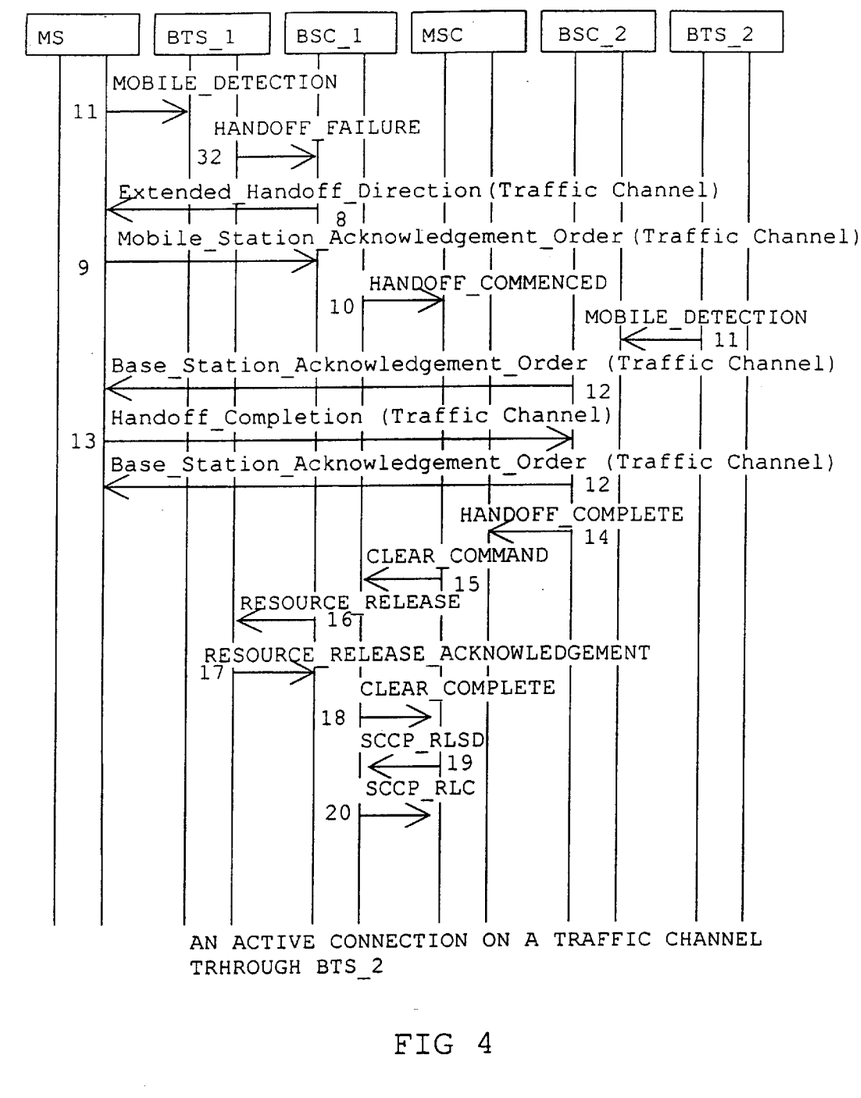
FIG. 4 shows a flow chart of a situation in which a new attempt is made for performing a hard handoff to a same base station after a failed handoff.

If the hard handoff fails, the handoff can easily be repeated in the solution in accordance with the invention by repeating the handoff procedure to the same base station BTS_2, as long as there is a channel reserved for the subscriber station MS at BTS_2. FIG. 4 illustrates this feature of the invention. When the handoff is repeated to the same base station BTS_2, it is not necessary to repeat the entire handoff procedure, but the BSC_1 only has to send the same signal 8 Extended_Handoff_Direction as in the case shown in FIG. 3 to the subscriber station MS after a failed hard handoff. The procedures shown in FIGS. 3 and 4 are thus examples of successive events. When a repeated handoff attempt is successful, the procedure in the flow chart after signal 8 Extended_Handoff_Direction is the same as in FIG. 2. Signal 8 Extended_Handoff_Direction may, however, contain usage parameter values different from those in the first handoff attempt in FIG. 3. An attempt is thus made for increasing the chances of a successful handoff. The difference may be constituted e.g., by changing the values of the power control parameters NOM_PWR_EXT and NOM_PWR having an effect on the transmitting power of the subscriber station MS in such a way that the transmitting power of the subscriber station MS increases when it attempts to establish a connection with a new base station BTS_2.

Figure 5:
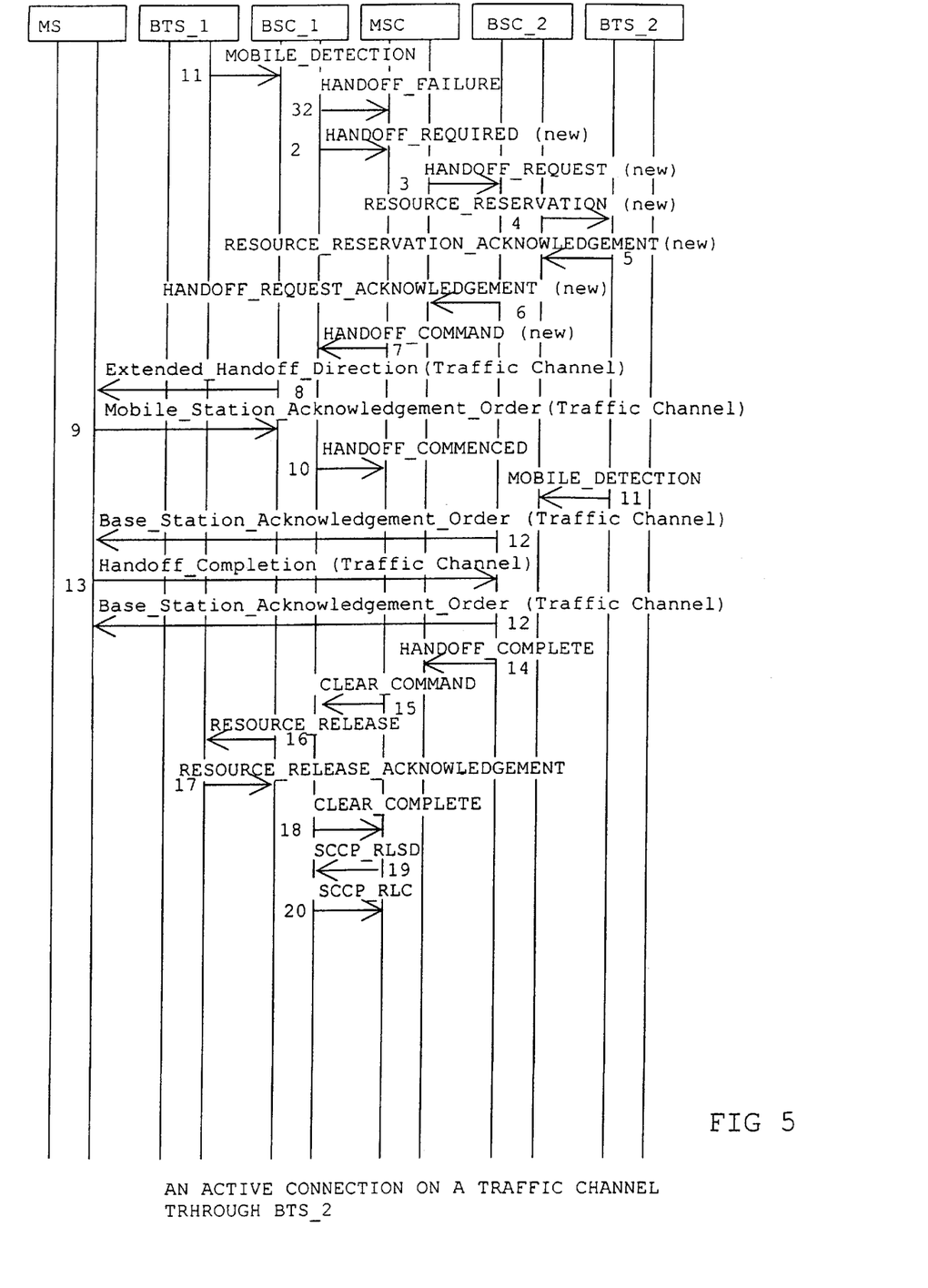
FIG. 5 shows a flow chart of a situation in which a new attempt is made for performing a hard handoff to a new base station after a failed handoff.

If the hard handoff fails, a handoff may advantageously be repeated to a new base station. FIG. 5 illustrates this feature of the intention. When a hard handoff attempt is not wished to be repeated to the same base station BTS_2, the entire handoff procedure must be repeated, since a permission for a handoff must be requested from the new base station controller BSC_X, whereby BSC_X reserves a channel for the subscriber station MS for the connection. A new handoff to the second base station BTS_X may be attempted any time after the first handoff has failed. This may take place immediately or later after the BSC_1 has sent to the MSC_1 signal 12 HANDOFF_FAILURE. The handoff thus proceeds in the same way in FIG. 5 and FIG. 2 after BSC_1 has transmitted signal 2 HANDOFF_REQUIRED after the first hard handoff has failed.

Figure 6:
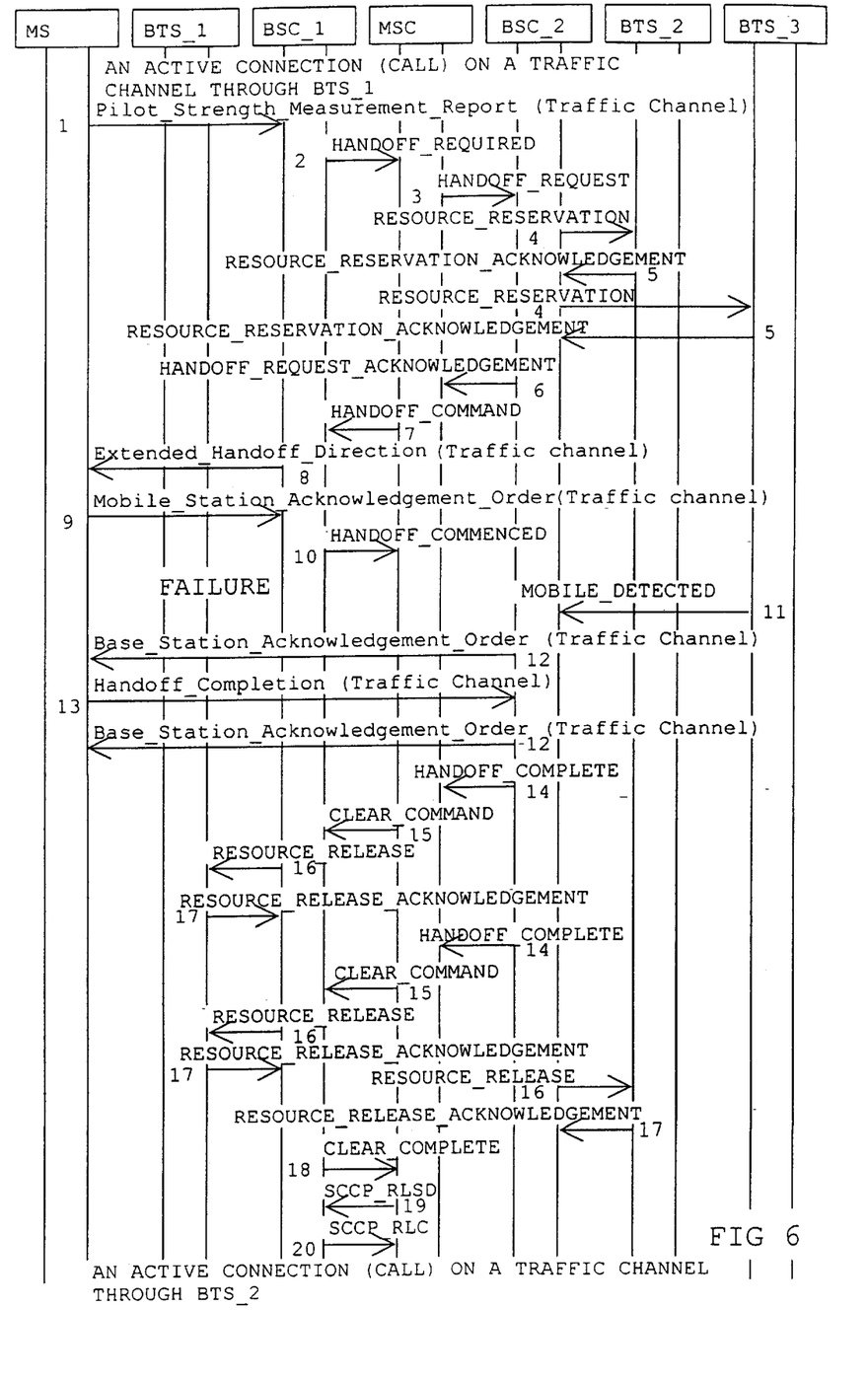
FIG. 6 shows a flow chart of a situation in which an attempt is made for performing a hard handoff simultaneously to several base stations.

In the solution of the invention, a handoff may be carried out to several base stations. This feature of the invention is described with reference to FIG. 6. In this case, the handoff is requested with signal 3 HANDOFF_REQUEST from one base station controller BSC_2 only, since both BTS_2 and BTS_3 are under control of the same base station controller BSC_2. If BTS_2 and BTS_3 were under control of separate base station controllers, signal 3 HANDOFF_REQUEST sent from the MSC should be transmitted to both base station controllers. BSC_2 reserves resources from both base stations BTS_2 and BTS_3 with signal 4 RESOURCE_RESERVATION, which is transmitted to both base stations separately and which is acknowledged to BSC_2 by base stations BTS_2 and BTS_3 with signal 5 RESOURCE_RESERVATION_ACKNOWLEDGEMENT. Thereafter, in the hard handoff method of the invention, the method proceeds in the same way as in the case shown in FIG. 2 until the actual start of the handoff, that is, until the initial base station controller BSC_1 transmits signal 10 HANDOFF_COMMENCED. The subscriber station MS then makes an attempt to establish a connection to BTS_2, which is assumed to fail, in this example. The handoff attempt to BTS_3, in turn, is successful, whereafter a connection is established to BTS_3 in the same way as to BTS_2 in FIG. 2. In the solution of the invention, the connection between BSC_2 and BTS_2, and the connections reserved for the subscriber station MS are released as soon as possible, since the handoff to BTS_2 was not successful. The release advantageously takes place at the same moment as the release of the resources from BTS_1, but it is not limited to that particular moment, however. In FIG. 6, releasing the resources of BTS_2 is marked with signal 16 RESOURCE_RELEASE from BSC_2 to BTS_2, and with an acknowledgement signal 17 RESOURCE_RELEASE_ACKNOWLEDGEMENT from BTS_2 to BSC_2.

Figure 7A:
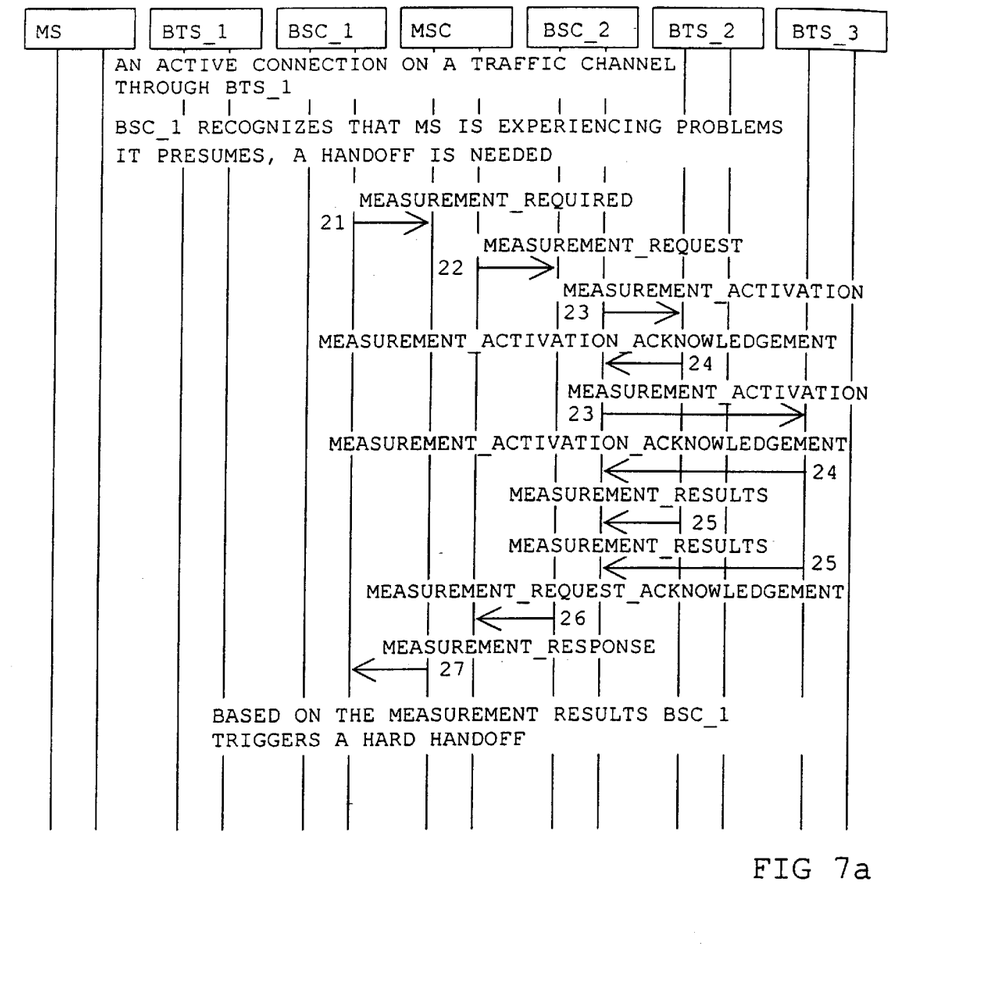
FIG. 7a shows the first part of a situation in which a hard handoff is performed with the assistance of a base station.
Figure 7B:
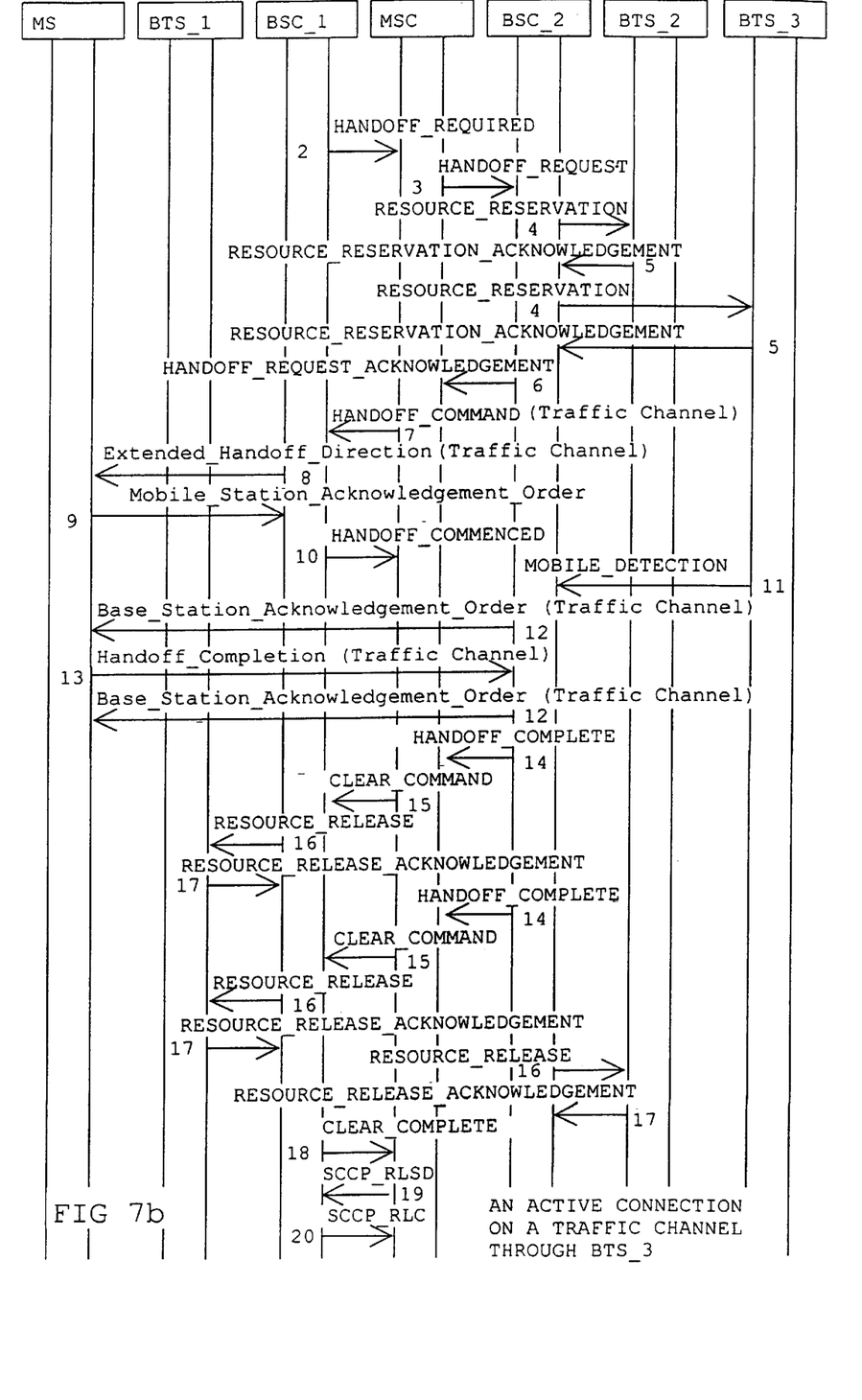
FIG. 7b shows the latter part of the flow chart showing a situation in which a hard handoff is performed with the assistance of a base station.

Besides the subscriber station, some other part of the radio system may also assist a hard handoff. FIGS. 7a and 7b illustrate a handoff in which base stations measure a signal received from a subscriber station and control the handoff on the basis of the measurements. Assuming the initial situation to be such that a subscriber station MS is communicating with BTS_1, which is controlled by BSC_1. BSC_1 detects that MS has problems with its connection with BTS_1. BSC_1 then requests the MSC with a signal 21 MEASUREMENT_REQUIRED that the other base stations BTS_2 and BTS_3 start measuring the signal of the subscriber station MS, on the basis of which measurements it would be possible to perform a hard handoff at least to either of the base stations BTS_2 and BTS_3. The number of the other base stations that are requested to measure the signal of the subscriber station MS must be at least one, but their number is not specifically limited. On the basis of the request it has received, the MSC requests from BSC_2 with a signal 22 MEASUREMENT_REQUEST that measurements are to be carried out. BSC_2, in turn, activates base stations BTS_2 and BTS_3 with a signal 23 MEASUREMENT_ACTIVATION, which is acknowledged by both base stations BTS_2 and BTS_3 with a signal 24 MEASUREMENT_ACTIVATION_ACKNOWLEDGEMENT. After the measurements, BTS_2 and BTS_3 return the measurement results to BSC_2 with a signal 25 MEASUREMENT_RESULTS. Although the actual measurement is carried out by BTS_2 and BTS_3, BSC_2 typically participates in the measurements by calculating the quality of the signal. Thereafter, BSC_2 acknowledges the measurement request 22 obtained from the MSC with a signal 26 MEASUREMENT_REQUEST_ACKNOWLEDGEMENT, in which the measurement results are transferred to the MSC. The MSC forwards the measurement results to BSC_1 with a signal 27 MEASUREMENT_RESPONSE. At this stage BSC_1 compares the quality of the signal it has received from the MS with the quality of the signal received by the other base stations BTS_2 and BTS_3 and BSC_2. The comparison may be carried out with respect to the signal strength, signal-to-noise ratio, bit-error-ratio or some other corresponding value describing the quality of the signal. Assuming that the quality of the signal is the best at BTS_3. BSC_1 thus requests the MSC to perform a handoff to BTS_3 with signal 2 HANDOFF_REQUIRED. Thereafter, the procedure continues in accordance with the method of the invention, which is illustrated in FIG. 2.

Figure 8:
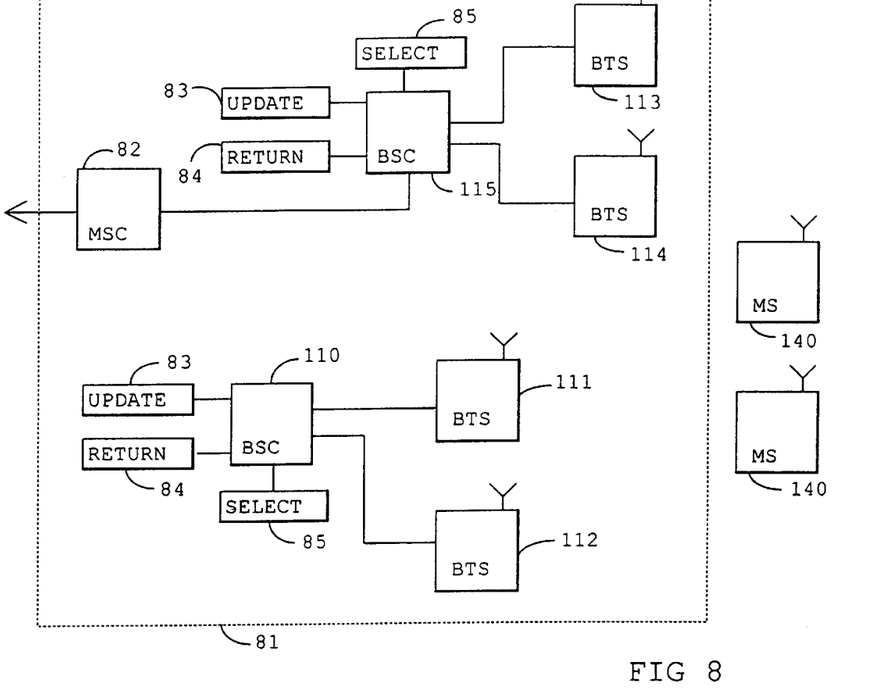
FIG. 8 shows a network element of the radio system.
Figure 9:
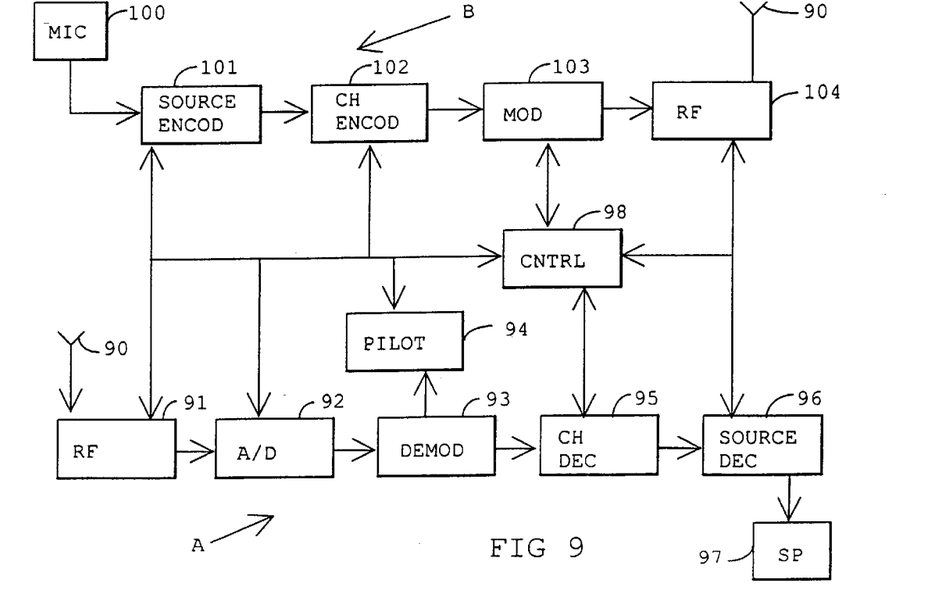
FIG. 9 shows a subscriber station.

Turning now study the radio system of the invention in greater detail with reference to FIGS. 8 and 9, FIG. 8 shows a radio system comprising a network system 81 and subscriber stations 140. The network system 81, which represents a part of the radio network comprising no subscriber stations, comprises a mobile services switching center 82, which is connected to base station controllers 110 and 115. A base station controller 110 controls base stations 111 and 112, and a base station controller 115 controls base stations 114 and 113. In a preferred embodiment of the invention, the network system comprises updating means 83 for updating the usage parameters of the subscriber station 140 for the following connection prior to a hard handoff. In the solution of the invention, the network system also comprises recovery means 84 for reserving and recovering the initial connection to the first base station or group of base stations when a hard handoff to the second base station or group of base stations fails. This takes place so that the channel reservation is not released, and a reserved channel is thus not assigned to another use during the reservation. The information on reservation is stored in the recovery means 84. In addition, the network system comprises assisting means 85 which are used for selecting on the basis of the information obtained from the subscriber station 140 the base station or group of base stations having the best signal strength as the following communication partner of the subscriber station 140 in the hard handoff. The updating means 83, the recovery means 84, and the means 85 for assisting a hard handoff are advantageously located in the base station controller 110 and 115.

FIG. 9 shows the essential parts of a subscriber station of a preferred embodiment of the invention. The subscriber station comprises a receiver part A and a transmitter part B. The receiver part A comprises an antenna 90, Radio Frequency (RF) sections 91, and A/D converter 92, a demodulator 93, handoff means 94, a channel decoder 95, a source decoder 96 and a loudspeaker 97. The transmitter part B comprises a microphone 100, a source decoder 101, a channel coder 102, a modulator 103, radio frequency sections 104 and an antenna 90.

The receiver part A operates as follows. A radio frequency analog signal 90 received from the antenna 91 is shifted onto the intermediate frequency and filtered by means of the radio frequency sections. The filtered signal is converted into a digital form by means of the A/D converter 92. The demodulator 93 comprises an incoherent demodulator, which returns the broadband, spreading coded pseudo-noise signal into a narrowband data signal, and an orthogonal demodulator, which determines the bits of the received data signal usually on the basis of correlation. In the demodulator 93, different diversity combinations are usually also carried out, in case a demodulator is employed in the receiver part A. Signal measuring means 94 advantageously measure the pilot signals of the base stations. The measuring means 94 transmit the measuring data advantageously with the assistance of control means 98 to the network system of the radio system, i.e. typically to the base station controller. Measuring several pilot signals of different frequencies requires a separate receiver part A for each frequency.

The channel decoder 95 decodes a typically convolution coded signal, and its operation is based e.g. on the Viterbi algorithm. The channel decoder 95 also usually comprises means for decryption and deinterleaving of the pre-handled signal. The source decoder 96 decodes a signal usually coded on the basis of RELP (Residually Exited Linear Predictive Coder) and received from the channel decoder 95, and converts it from digital to analog form, and finally amplifies it to a form suitable for the loudspeaker 97.

The operation of the transmitter part B takes place as follows. The microphone 100 receives an audio signal and transmits its electric equivalent to the source decoder 101, which converts it from analog to digital form and codes it, e.g. on the basis of RELP. From the source coder 101, the digital signal passes to the channel coder 102, which typically convolution codes the signal. In addition, the channel coder 102 typically encrypts the signal and interleaves the bits or bit groups of the signal. The convolution coded narrowband signal is pseudo-noise coded into a broadband spread spectrum signal in the modulator 103. Thereafter, the analog signal is converted into a radio frequency signal in accordance with the prior art in the radio frequency sections 104 and transmitted via the antenna 90. The control means 98 controls the operation of both the receiver part A and the transmitter part B.

Figure 10:
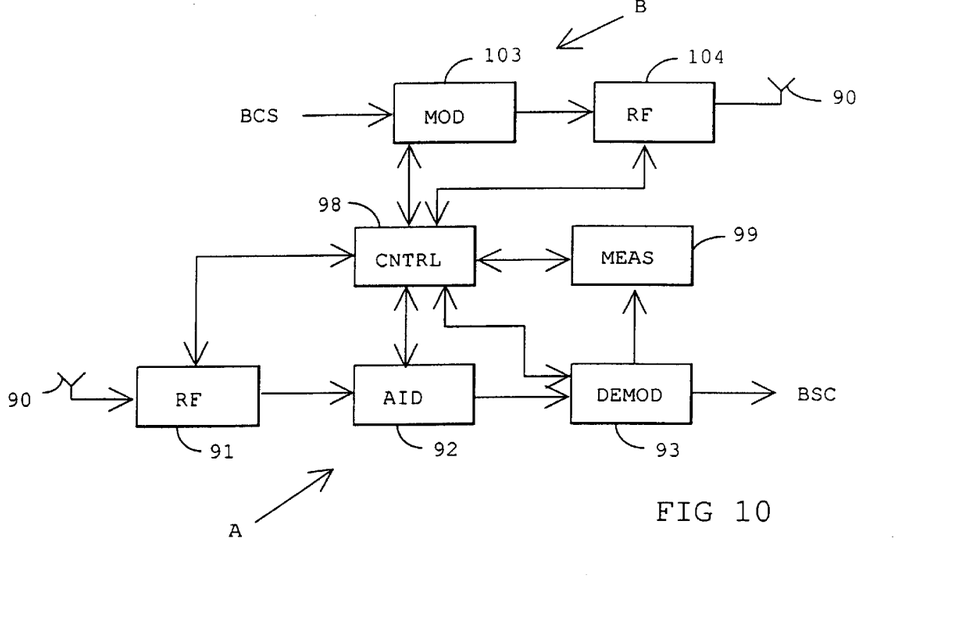
FIG. 10 shows a base station.

The base station transceiver shown in FIG. 10 is for the most part similar to the subscriber station not including a loudspeaker and a microphone, in particular. The base station transceiver, however, often comprises a plurality of receiver antennas (not shown in FIG. 10) for space-diversity reception. In addition, the signals of different antennas are therefore combined by means of diversity combiner means (not shown in FIG. 10). Means 90–93, 98 and 103–104 substantially function in the same way as those of the subscriber station. Means 99 measure the signal received from the subscriber station, and this measurement data is forwarded to the base station controller for the decisions related to handoff.

The processing means for processing the digital signal in the various parts the radio system and the operations included therein are implemented in the solutions in accordance with the prior art by means of a signal processor making use of VLSI and ASIC circuits. The antenna is a transmission and reception antenna in accordance with a prior art radio system. The microphone 100, the loudspeaker 97, the radio frequency sections 91 and 104, as well as the A/D converter are also prior art parts used in the present radio systems.

Although the invention has been disclosed above with reference to the example in accordance with the attached drawings, it is obvious that the invention is not limited thereto, but it may be modified in a variety of ways within the scope of the inventive idea set forth in the attached claims.

I claim:

1. A method for performing a hard handoff in a radio system in which there are a plurality of base stations and a plurality of subscriber stations, comprising the steps of:

one of said subscriber stations communicating via a first connection or connections with a first one of said base station or to a first group of said base stations, using respective signals;

said system attempting to perform a hard handoff of said subscriber station to establish a second connection or connections to a second one of said base stations or to a second group of said base stations, for communicating using respective signals, and, until successfully accomplishing said hard handoff, maintaining a reservation of resources for said first connection or connections; in connection with said attempting determining by an operator of a length of time for maintaining said reservation; and if said hard handoff fails, using said reservation to recover said first connection or connections, but if said hard handoff succeeds, releasing said reservation.

2. The method as claimed in claim 1, wherein:

driving said communication, at least some of said base stations operating on a same frequency band as said subscriber station and others of said base stations operating on a different frequency from said base station, and, as part of said operating, said some and said others of said base stations transmitting respective pilot signals on said respective frequency bands;

said subscriber station receiving and measuring said pilot signals; and said attempting being initiated by said subscriber station, on the basis of said measuring, determining that a second one of said base stations or a second group of said base stations is providing to the subscriber station a pilot signal or pilot signals having a better signal strength than a first one of said base stations or a first group of said base stations.

3. The method of claim 1, further comprises:

said system, in connection with said attempting, transmitting to said subscriber station usage parameters relating to said second one of said base stations or said second group of said base stations, said parameters being ones required for establishing said second connection or connections; and in connection with said hard handoff succeeding, establishing said second connection or connections in accordance with said usage parameters as received by said subscriber station as a result of said transmitting.

4. The method of claim 3, wherein:

said usage parameters, as transmitted to said subscriber station, include power control parameters of said subscriber station which are based on measurement data related to signal strengths of said second one of said base stations or said second group of said base stations, and said subscriber station.

5. The method of claim 1, 2 or 3, further comprising:

during said communicating, said system measuring the quality of the respective said signal of said subscriber station as received by said first one of said base stations or said first group of said base stations, and as received by said second one of said base stations or said second group of said base stations; and initiating said attempting when, as a result of said measuring of said quality, said system determines that the quality of the respective said signal of said subscriber station as received by said first one of said base stations or said first group of said base stations is poorer than the quality of the respective said signal of said subscriber station as received by said second one of said base stations or said second group of said base stations.

6. The method of claim 1, 2 or 3, wherein:

said first one of said base stations or said first group of said base stations before, during and after said attempting are operating on a different frequency band than said second one of said base stations or said second group of said base stations.

7. The method of claim 1, 2 or 3 wherein:

said system is a CDMA radio system.

8. A radio system including a network system, comprising:

at least one base station controller;

a plurality of base stations controlled by said at least one base station controller;

a plurality of subscriber stations, each arranged to participate in a hard handoff of the respective subscriber station from a first connection or connections to a first one of said base stations or a first group of said base stations, to a second one of said base stations or a second group of said base stations; and hard handoff means for attempting to perform a hard handoff of said subscriber station to establish a second connection or connections to a second one of said base stations or to a second group of said base stations by performing a handshaking operation between the first and second base stations in a traffic channel, for communicating using respective signals, and, until successfully accomplishing said hard handoff, maintaining a reservation of resources for said first connection or connections for a length of time determined by an operator, and, if said hard handoff fails, for using said reservation to recover said first connection or connections, but if said hard handoff succeeds, for releasing said reservation.

9. The radio system of claim 8, wherein said network system further includes:

an updating means arranged for transmitting to said subscriber station usage parameters relating to said second one of said base stations or said second group of said base stations, said parameters being ones required for establishing said second connection or connections; and said network system being arranged for establishing, in connection with said hard handoff succeeding, said second connection or connections in accordance with said usage parameters as received by said subscriber station as a result of said transmitting.

10. The radio system of claim 9, wherein:

said updating means are arranged for providing said usage parameters, as transmitted to said subscriber station, to include power control parameters of said subscriber station which are based on measurement data related to signal strengths of said second one of said base stations or said second group of said base stations, and said subscriber station.

11. The radio system of claim 8, wherein said network system further includes:

means for assisting initiating attempting said hard handoff, including:
  measuring means measuring the quality of the respective said signal of said subscriber station as received by said first one of said base stations or said first group of said base stations, and as received by said second one of said base stations or said second group of said base stations; and
  means for initiating said attempting when, as a result of said measuring of said quality, said system determines that the quality of the respective said signal of said subscriber station as received by said first one of said base stations or said first group of said base stations is poorer than the quality of the respective said signal of said subscriber station as received by said second one of said base stations or said second group of said base stations.

12. The radio system of claim 8, wherein said at least one base station controller includes:

recovery means arranged for using said reservation to recover said first connection or connections if said hard handoff fails;

updating means arranged for transmitting to said subscriber station usage parameters relating to said second one of said base stations or said second group of said base stations, said parameters being ones required for establishing said second connection or connections; and means for assisting initiating attempting said hard handoff, including:

measuring the quality of the respective said signal of said subscriber station as received by said first one of said base stations or said first group of said base stations, and as received by said second one of said base stations or said second group of said base stations; and
  means for initiating said attempting when, as a result of said measuring of said quality, said system determines that the quality of the respective said signal of said subscriber station as received by said first one of said base stations or said first group of said base stations is poorer than the quality of the respective said signal of said subscriber station as received by said second one of said base stations or said second group of said base stations.

13. A method for performing a hard handoff in a radio system in which there are a plurality of base stations and a plurality of subscriber stations, the method comprising:

one of said subscriber stations communicating via a first connection with a first one of said base stations or to a first group of said base stations;

maintaining a reservation of resources for said first connection while attempting to perform a hard handoff of said subscriber station to establish a second connection to a second one of said base stations or to a second group of said base stations, the attempting to perform a hard handoff including performing a handshaking operation between the first and second base stations in a traffic channel;

using said reservation to recover said first connection when said hard handoff fails; and releasing said reservation when said hard handoff succeeds.

14. A method for performing a hard handoff in a radio system in which there are a plurality of base stations and a plurality of subscriber stations, the method comprising:

one of said subscriber stations communicating via a first connection with a first one of said base stations or to a first group of said base stations;

maintaining a reservation of resources for said first connection while attempting to perform a hard handoff of said subscriber station to establish a second connection to a second one of said base stations or to a second group of said base stations, the attempting to perform a hard handoff including performing a handshaking operation between the first and second base stations in a traffic channel;

transmitting usage parameters to the subscriber station, the usage parameters relating to a second base station or to the second group of base stations and being required for a new connection before establishing the actual new connection;

attempting to establish the new connection by performing a hard handoff to said second base station or the second group of said base stations in accordance with said usage parameters;

using said reservation to recover said first connection when said hard handoff fails; and releasing said reservation when said hard handoff succeeds.

* * * * *